(12) United States Patent
Kranz et al.

(10) Patent No.: US 8,302,822 B2
(45) Date of Patent: Nov. 6, 2012

(54) PRESSURE REGULATORS FOR BEVERAGE DISPENSERS

(75) Inventors: Timothy P. Kranz, Woodland Park, CO (US); Benjamin Grill, Woodland Park, CO (US); James A. Peña, Encinitas, CA (US)

(73) Assignee: Sturman BG, LLC, Woodland Park, CO (US)

( * ) Notice: Subject to any disclaimer, the term of this patent is extended or adjusted under 35 U.S.C. 154(b) by 1148 days.

(21) Appl. No.: 12/059,965

(22) Filed: Mar. 31, 2008

(65) Prior Publication Data

US 2009/0242044 A1    Oct. 1, 2009

(51) Int. Cl.
*B65D 83/00*    (2006.01)

(52) U.S. Cl. ............... 222/396; 222/399; 137/614.2; 137/505.36; 137/505.44

(58) Field of Classification Search ............. 137/497, 137/505.36, 505.44, 505.38, 614.2, 505.442; 222/80, 81, 396, 398, 414, 399; 221/80, 221/397; 251/335.2

See application file for complete search history.

(56) References Cited

U.S. PATENT DOCUMENTS

| | | | | |
|---|---|---|---|---|
| 2,388,026 A * | 10/1945 | Ward | ............ | 137/630.22 |
| 2,530,583 A | 11/1950 | Nurkiewicz | | |
| 2,876,794 A * | 3/1959 | Reedy | ............ | 137/517 |
| 5,022,565 A * | 6/1991 | Sturman et al. | ............ | 222/396 |
| 5,329,975 A * | 7/1994 | Heitel | ............ | 141/19 |
| 5,395,012 A * | 3/1995 | Grill et al. | ............ | 222/4 |
| 5,443,186 A * | 8/1995 | Grill | ............ | 222/396 |
| 5,551,605 A | 9/1996 | Bethlendy | | |
| 5,683,730 A | 11/1997 | Katsumata et al. | | |
| 5,881,765 A * | 3/1999 | Turney et al. | ............ | 137/484.4 |
| 5,979,713 A * | 11/1999 | Grill | ............ | 222/399 |
| 6,036,054 A | 3/2000 | Grill | | |
| 7,845,522 B2 * | 12/2010 | Grill | ............ | 222/399 |
| 2005/0269282 A1 * | 12/2005 | Luch | ............ | 215/256 |
| 2006/0169725 A1 | 8/2006 | Grill | | |

* cited by examiner

*Primary Examiner* — John K Fristoe, Jr.
*Assistant Examiner* — Time Aigbe
(74) *Attorney, Agent, or Firm* — Blakely Sokoloff Taylor & Zafman LLP

(57) ABSTRACT

Pressure regulators for beverage dispensers of the type using a high pressure gas cartridge such a $CO_2$ cartridge. The regulators provide a simple, low cost, easily assembled and reliable regulator of particularly small size, facilitated in part by the fact that the invention allows the use of a diaphragm of a particularly small size without necessitating the use of expensive and bulky diaphragm clamps, such as threaded clamps, yet is able to provide a more than adequate seal at both the inner and outer portions of the diaphragm.

4 Claims, 5 Drawing Sheets

PRESSURE REGULATORS FOR BEVERAGE DISPENSERS

BACKGROUND OF THE INVENTION

1. Field of the Invention

The present invention relates to the field of beverage dispensers, and more particularly, beverage dispensers with pressure regulators for regulating the gas pressure from a gas cartridge to a beverage to be dispensed.

2. Prior Art

U.S. Pat. No. 5,022,565 discloses a soft drink dispenser which includes a regulator for receiving $CO_2$ under a relatively high pressure from a $CO_2$ cartridge and providing a regulated pressure to the beverage within a container connected to the soft drink dispenser. Because of the very limited space available for the pressure regulator, the regulator used a sliding regulator member sealed with respect to the regulator housing by an O-ring. Such a regulator construction has the disadvantage of the friction of the O-ring, compounded by unit to unit dimensional variations in the O-rings themselves, as well as the O-ring groove it fits into, and the diameter of the cylindrical surface in which it slides. These variations can result in undesired unit to unit regulated pressure variations for carbonated beverages. Too low a pressure will not maintain the desired carbonation in the beverage, whereas too high a pressure will tend to over-carbonate the beverage, causing an excessive rate of consumption of the $CO_2$, and increasing the dispenser delivery rate, which together with the over-carbonation leads to excessive foaming in certain beverages and in general the loss of carbonation in the beverage which reaches the consumer's glass or cup.

DETAILED DESCRIPTION OF THE PREFERRED EMBODIMENTS

Figure 1:
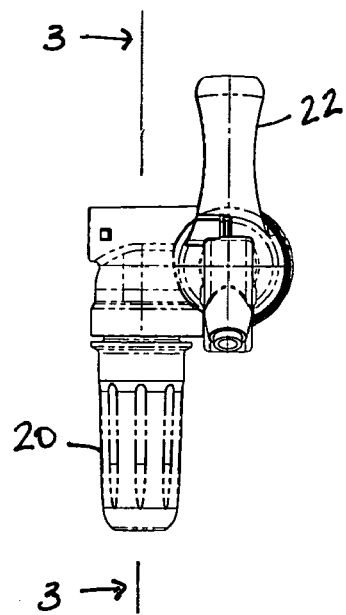
FIG. 1 is a front view of a beverage dispenser incorporating the present invention.
Figure 2:
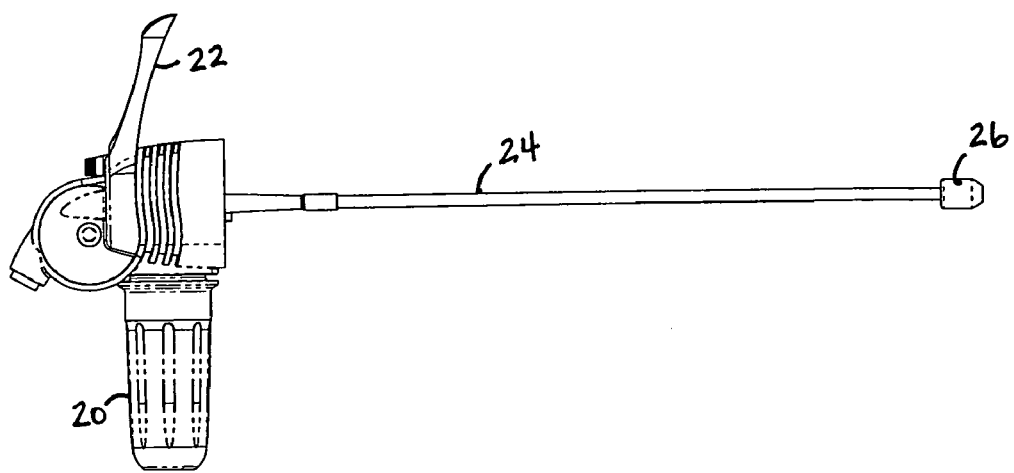
FIG. 2 is a side view of the beverage dispenser of FIG. 1.

FIG. 1 is a front view and FIG. 2 is a side view of a beverage dispenser incorporating the regulator of the present invention. This dispenser is intended for screwing onto a beverage container which is then laid on its side, such as would be convenient for sliding into a refrigerator, though the present invention may readily be configured for use in dispensers intended to be used with vertical containers, as in U.S. Pat. No. 5,022,565. Visible in FIGS. 1 and 2 is a $CO_2$ cartridge holder 20, a dispensing handle 22, and in FIG. 2, a flexible tube 24 weighted on end 26 to sink to the lower surface of the horizontal container for beverage dispensing.

Figure 3:
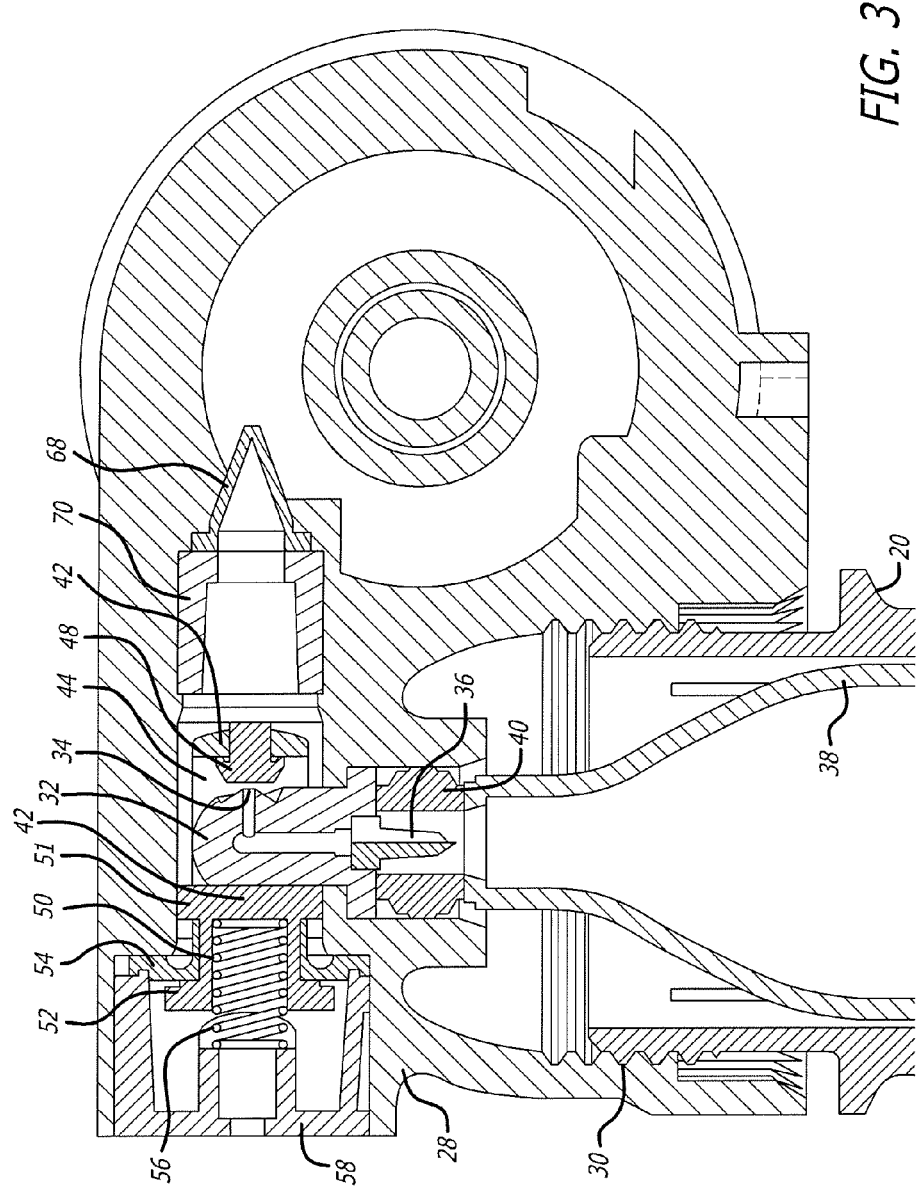
FIG. 3 is a cross section taken through the beverage dispenser along line 3-3 of FIG. 1, illustrating the cross section of an embodiment of pressure regulator in accordance with the present invention.

Now referring to FIG. 3, a cross section of the regulator of the present invention taken along line 3-3 of FIG. 1 may be seen. The regulator body 28 has a threaded region 30 for receiving the cartridge holder 20. Above the threaded region is an orifice member 32 pressed into the body 28 and defining an orifice 34. The orifice member 32 has a piercer 36 pressed thereinto for piercing the end of a $CO_2$ cartridge 38 when the cartridge holder 20 with a $CO_2$ cartridge therein is screwed into the body. The piercer 36 of the preferred embodiment comprises a stainless steel member partially cut away along its axis as shown, which form of piercer has been found to cleanly pierce the end of a $CO_2$ cartridge without allowing the clogging of the opening so formed. Below the piercer 36 is an elastomeric seal member 40. The seal member 40 is configured to engage and seal against the end of a $CO_2$ cartridge 38 before the end contacts the piercer 36, though to allow redistribution of the seal member 40 on continued screwing in of cartridge holder 20 until the $CO_2$ cartridge is pierced in the cartridge holder and cannot be screwed in any further. Such an arrangement prevents $CO_2$ leakage, even after the person screwing in the cartridge holder 20 pauses after the initial piercing of the top of the $CO_2$ cartridge before further tightening the cartridge holder. In that regard, another benefit of the specific piercer design of the preferred embodiment is that the piercer requires a shallower piercing depth than the standard designs used today. That requires less travel when activating the $CO_2$, which is important in having a seal that can engage the cartridge prior to piercing. Also, it takes some travel after contact with the CO2 cartridge by the piercer to actually release gas. A tolerance check assures that the seal 40 is sufficiently compressed prior to potential gas release, not prior to contacting the CO2 cartridge with the piercer (although the two are very close).

Figure 4A:
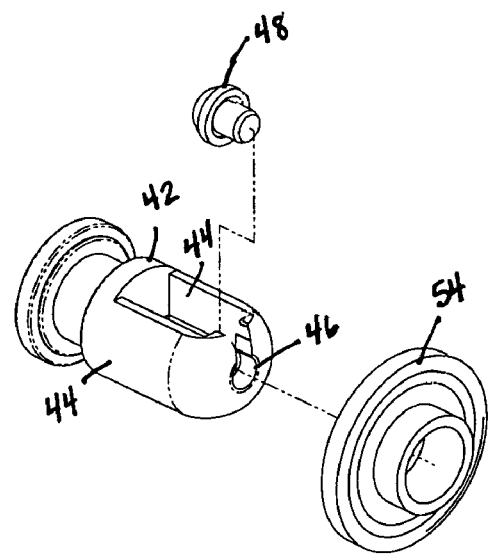
FIG. 4a is a perspective view of the regulator member of the regulator of FIG. 3.

When the orifice member 32 is pressed into the body 28, a regulator member 42 is first positioned in an opening in the body substantially perpendicular to the opening in the body coaxial with the threaded region 30 so that when the orifice member 32 is pressed into the body as shown, the orifice member 32 will extend between sides 44 of the regulator member 42. The form of the regulator member 42 may be best seen in FIG. 4a, which is an exploded perspective view of the regulator member and diaphragm, shown in a smaller scale in FIG. 5. As may be seen therein, the two end regions of the regulator member 42 are integrally connected by sides 44. At the right end of the regulator member 42 is an opening 46 (see FIG. 4a), into which a seal member 48 (FIG. 3) has been pressed to seal against the orifice 34 when the regulator member 42 moves to the left to force the seal member 48 against the orifice 34.

At the left end of regulator member 42 is a cylindrical region 50 terminating at the left at a flange 52 and having a second flange 51 spaced to the right from flange 52. An elastomeric diaphragm 54 is stretched over the right end of regulator member 42 to fit tightly around and seal with respect to the cylindrical section. In that regard, the inside diameter of the diaphragm 54 is somewhat less than the diameter of the cylindrical section 50, and accordingly, seals tightly against the cylindrical section without the use of clamps of any kind, even though the regulator member, including the surface of the cylindrical section, is as-molded, i.e., not machined. The diaphragm, of course, is also assembled onto the regulator member 42 before pressing the orifice member into position in the assembly.

Figure 4B:
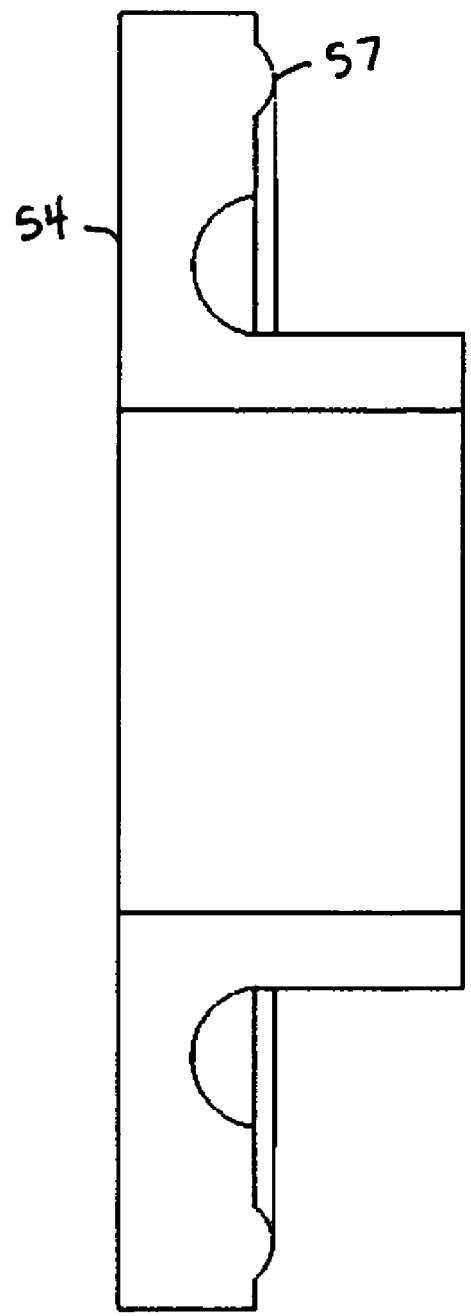
FIG. 4b is a cross section of the diaphragm 54 in its undeflected state, taken on an expanded scale.

An annular projection on a retainer 58 is forced against the left side of the elastomeric diaphragm 54 adjacent the periphery thereof. The diaphragm itself has an integral O-ring like protrusion 57 on the opposite side at the diameter of the annular projection on the retainer 58, as best seen in FIG. 4b. This creates a local high pressure between the diaphragm and the adjacent wall of body 28, forming a tight seal between the diaphragm and dispenser body when the retainer 58 is in its assembled position.

Figure 5:
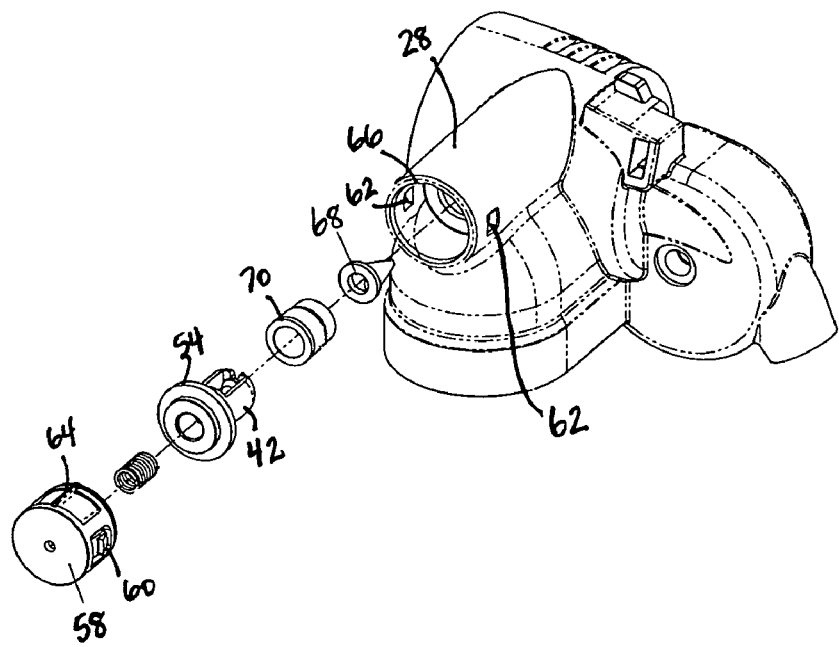
FIG. 5 is an exploded view of the regulator and regulator housing.

The left end of the regulator member is hollow and receives a regulator spring 56 acting between the retainer 58 and the regulator member. As best seen in FIG. 5, the retainer 58 has two fingers 60, one on each side, that snap into openings 62 in the body 28 from inside the body. To assure proper angular orientation of the retainer so that the fingers snap into the openings in the body 28 as intended, the retainer has an outward projecting rib 64 which slides into a cooperatively disposed slot 66 molded into the body 28. Thus the diaphragm is sealed on its inner diameter and near its periphery without any screws or other adjustable clamps. This is very important because of the small size of the regulator and the diaphragm itself. It also results in ease of assembly, resulting in overall lower assembly costs. In that regard, typically the diaphragm should be smaller in diameter than the $CO_2$ cartridge itself, and in a preferred embodiment, the diaphragm has an outer diameter of only approximately 70% of the outer diameter of the $CO_2$ cartridge.

In addition, the regulator assembly of the embodiment illustrated includes a duck bill one-way valve 68 held in place by another retainer pressed into the body 28. These of course are first assembled before the regulator member 42 with diaphragm 54 thereon are put in position and the orifice member 32 with piercer 36 therein is pressed into position in the body 28.

Figure 6:
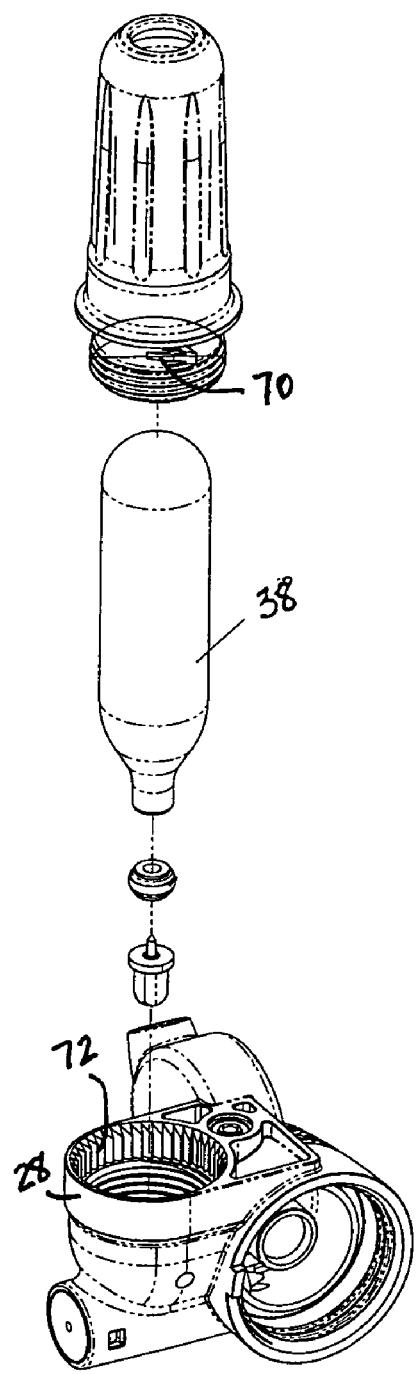
FIG. 6 is an exploded view of the cartridge holder, a cartridge, the cartridge seal, piercer and regulator housing of the dispenser of FIGS. 1 and 2.

Finally, to assure that the dispenser is not misused, such as by unscrewing the cartridge holder 20 when a cartridge 38 has been pierced but is still substantially full of $CO_2$, a pair of integral elastic fingers or pawls 70 (FIG. 6) are molded into the cartridge holder 20 which engage a female ratchet wheel 72 molded into the dispenser body 28. The pawls 70 engage the female ratchet wheel 72 in the dispenser body 28 before a cartridge 38 is pierced, preventing the subsequent unscrewing of the cartridge holder 28 after the $CO_2$ cartridge is pierced. As an additional safety feature, the number of threads between the cartridge holder 20 and the dispenser body 28 is chosen such that even if the pawls 70 are forcibly broken, a person will not be able to fully unscrew the cartridge holder containing an activated cartridge without first venting the gas pressure of the cartridge. Alternatively, one could use a cartridge with a built-in orifice such that if the dispenser is dropped in such a way that the cartridge holder is knocked loose, the orifice built into the cartridge would keep the pressurized cartridge from becoming a projectile.

The regulator of the present invention provides a simple, low cost, easily assembled and reliable regulator of particularly small size, facilitated in part by the fact that the invention allows the use of a diaphragm of a particularly small size without necessitating the use of expensive and bulky diaphragm clamps, such as threaded clamps, yet is able to provide a more than adequate seal at both the inner and outer portions of the diaphragm. However, while a preferred embodiment of the present invention has been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A pressure regulator comprising:
a regulator body having a first threaded region for engaging cooperatively disposed threads on a $CO_2$ cartridge holder, and having a first opening coaxial with the first threaded region;
the regulator body having a second opening intersecting the first opening and having an axis substantially perpendicular to the first opening, the second opening being disposed to deliver $CO_2$ at the regulated pressure to a beverage container when fastened to a beverage container;
a regulator member within the second opening;
an orifice member in the first opening and projecting between two sides of the regulator member to define an orifice facing the delivery side of the second opening;
the regulator member having a first end region having an orifice closure member therein adjacent the orifice, and a second end region, the first and second end regions being integrally coupled by the two sides of the regulator member;
the second end region defining an outer surface between first and second flange regions;
a flexible diaphragm having an inner surface stretched over, restrained from movement and sealing with respect to the outer surface of the second end region of the regulator member between the first and second flanges, and having a outward extending flexible region;
a retainer snapped into an end of the second opening to lock and seal an outer edge region of the outward extending flexible region to the regulator body; and,
a spring disposed between the retainer and the second end region of the regulator member to push the second end region toward the orifice member.

2. A pressure regulator comprising:
a $CO_2$ cartridge holder;
a regulator body having a first threaded region for screwing onto a beverage container, a second threaded region for engaging cooperatively disposed threads on a $CO_2$ cartridge holder, and a first opening coaxial with the second threaded region;
the regulator body and $CO_2$ cartridge holder being configured to prevent unscrewing of the $CO_2$ cartridge holder from the regulator body;
the regulator body having a second opening intersecting the first opening and having an axis substantially perpendicular to the first opening, the second opening being disposed to deliver $CO_2$ at the regulated pressure to the beverage container when screwed onto the beverage container;
a regulator member within the second opening;
an orifice member in the first opening and projecting between two sides of the regulator member to define an orifice facing the delivery side of the second opening;
the regulator member having a first end region having an orifice closure member therein adjacent the orifice and a second end region, the first and second end regions being integrally coupled by the two sides of the regulator member;
the second end region defining an outer surface between first and second flange regions;
a flexible diaphragm having an inner surface stretched over, retained by and sealing with respect to the outer surface of the second end region of the regulator member between the first and second flanges, and having a outward extending flexible region;

a retainer snapped into an end of the second opening to lock and seal an outer edge region of the outward extending flexible region to the regulator body; and, a spring disposed between the retainer and the second end region of the regulator member to push the second end region toward the orifice member.

3. A pressure regulator comprising:

a $CO_2$ cartridge holder;

a regulator body having a first threaded region for screwing onto the beverage container, a second threaded region for engaging cooperatively disposed threads on a $CO_2$ cartridge holder, and a first opening coaxial with the second threaded region;

the regulator body and $CO_2$ cartridge holder being configured to prevent unscrewing of the $CO_2$ cartridge holder from the regulator body;

the regulator body having a second opening intersecting the first opening and having an axis substantially perpendicular to the first opening, the second opening being disposed to deliver $CO_2$ at the regulated pressure to the beverage container when screwed onto the beverage container;

a regulator member within the second opening;

an orifice member in the first opening and projecting between two sides of the regulator member to define an orifice facing the delivery side of the second opening;

the regulator member having a first end region having an orifice closure member therein adjacent the orifice and a second end region, the first and second end regions being integrally coupled by the two sides of the regulator member;

the second end region defining an outer surface between first and second flange regions;

a flexible diaphragm having an inner surface stretched over and sealing with respect to the outer surface of the second end region of the regulator member between the first and second flanges, and having a outward extending flexible region;

a retainer locking the outer edge region of the outward extending flexible region to the regulator body;

a spring disposed to push the second end region toward the orifice member;

the regulator body and $CO_2$ cartridge holder are configured to prevent unscrewing the $CO_2$ cartridge holder from the regulator body by a ratchet surface molded into an inner surface of the regulator body adjacent the second threaded region, and a plurality of elastic pawls molded into the cartridge holder;

the retainer having a plurality of fingers and is snapped into the end of the second opening by the fingers snapping into openings molded in the regulator body.

4. A pressure regulator comprising:

a $CO_2$ cartridge holder;

a regulator body having a first threaded region for screwing onto a beverage container, a second threaded region for engaging cooperatively disposed threads on a $CO_2$ cartridge holder, and a first opening coaxial with the second threaded region;

the regulator body and $CO_2$ cartridge holder being configured to prevent unscrewing of the $CO_2$ cartridge holder from the regulator body;

the regulator body having a second opening intersecting the first opening and having an axis substantially perpendicular to the first opening, the second opening being disposed to deliver $CO_2$ at the regulated pressure to the beverage container when screwed onto the beverage container;

a regulator member within the second opening;

an orifice member in the first opening and projecting between two sides of the regulator member to define an orifice facing the delivery side of the second opening;

the regulator member having a first end region having an orifice closure member therein adjacent the orifice and a second end region, the first and second end regions being integrally coupled by the two sides of the regulator member;

the second end region defining an outer surface between first and second flange regions;

a flexible diaphragm having an inner surface stretched over, retained by and sealing with respect to the outer surface of the second end region of the regulator member between the first and second flanges, and having a outward extending flexible region;

a retainer snapped into an end of the second opening to lock and seal an outer edge region of the outward extending flexible region to the regulator body; and, a spring disposed between the retainer and the second end region of the regulator member to push the second end region toward the orifice member;

wherein the retainer includes a plurality of fingers and is snapped into the end of the second opening by the fingers snapping into openings molded in the regulator body.

* * * * *